July 5, 1966 W. WEHMEYER 3,258,947
PROCESSES FOR PROTECTING PRODUCTS AND TOOLS DURING PHYSICAL
DEFORMATION OF HEAVY METALS AND PRODUCTS SO PRODUCED
Filed June 29, 1965
Fig:1
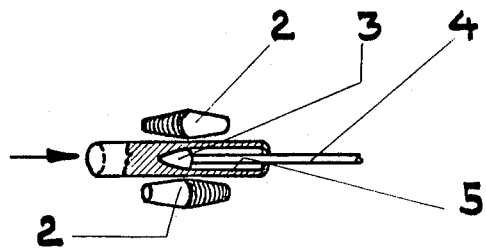
Fig:2
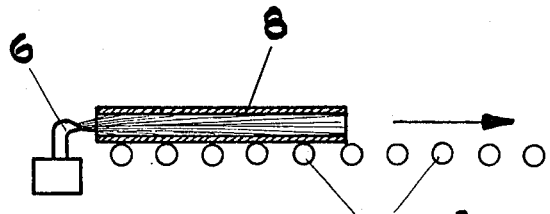
Fig:3
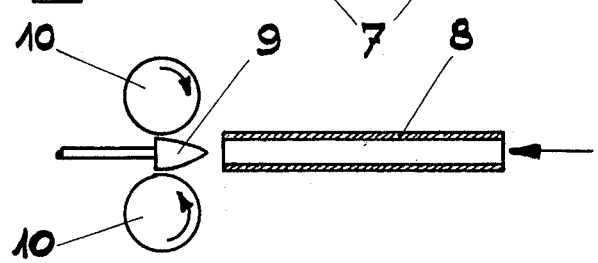
Fig:4
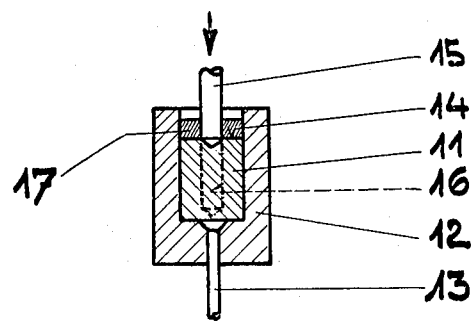
Fig:5

United States Patent Office 3,258,947
Patented July 5, 1966

3,258,947
PROCESSES FOR PROTECTING PRODUCTS AND TOOLS DURING PHYSICAL DEFORMATION OF HEAVY METALS AND PRODUCTS SO PRODUCED
Werner Wehmeyer, Essen, Germany, assignor to Schloemann Aktiengesellschaft, Dusseldorf, Germany
Filed June 29, 1965, Ser. No. 467,830
23 Claims. (Cl. 72—42)

This application is a continuation-in-part of my earlier applications Serial No. 258,904, now abandoned, filed February 15, 1963, and Serial No. 344,566 filed February 13, 1964.

This invention relates to the procedures for protecting products and tools during physical deformation of heavy metal work-pieces and to the products so produced and relates more particularly to the protection of the deformed metal products from oxidation by the oxygen of the cooling air and protection of the tool from frictional wear resulting from the deformation procedure.

It is conventional in the prior art to lubricate the interface between a metal workpiece or billet being deformed and the shaping tool in order to reduce the frictional contact therebetween. Basically, there are two general forms of lubricants known to the art. The use of a liquid lubricant is conventional in certain instances whereas a so-called compound lubricant is used in other environments. The latter is comprised basically of a liquid such as oil or the like in combination with a powder such as finely divided graphite or glass. The solid constituents of such a lubricant act to fill the interstitial voids of surfaces of the objects being lubricated thereby rendering such surfaces smooth and even. Compound lubricants of this type are particularly adapted for use in high pressure circumstances where the elements are tightly meshed with each other. The instant application pertains to the use of a particular class of compound lubricants which function simultaneously to reduce the frictional forces acting between a shaping tool and a workpiece being deformed thereby and to coat the deformed product with a loosely adhering, readily removable, uniformly dense, antioxidation layer. Specifically, the procedure of this application is of advantage in the deformation of heavy metals inasmuch as the light metals, that is, those that can be readily shaped at temperatures below, for example, 600° C., can be lubricated with relatively little difficulty by such conventional means as grease or metal soaps.

There are basically three types of materials which are interesting for a process of lubrication. The first, and most important for this invention, are those materials which have a space-lattice crystalline structure, that is, those materials which, in a solid condition, are held together in three directions in space to form, in effect, giant molecules. Such materials may be formed with chemical components having various bonding characteristics. As an illustration, a space-lattice crystalline material may be formed by molecules wherein the atomic nuclei lose outermost shell electrons on their own, or gain outermost shell electrons from outside, the + or − ions which are formed mutually holding one another fast in a crystalline ion lattice. These attractions act on all sides thereby forming a three-dimensined space-lattice structure. Similar space-lattice crystalline structures exist only in a solid state.

A second form of materials to be considered but not important for this invention are those in which the molecules are bonded together in only two directions in space, that is, in layer-lattice crystalline structures. Belonging to this group are such well-known lubricants as graphite, talc, clay, mica, etc., wherein the layers have a tendency to slide over each other under the application of heat and pressure.

Crystallization, that is, the formation of solid bodies of crystalline structure with an orderly arrangement of the atoms or molecules, can be formed from gasses or gaseous mixtures, by cooling or chemical precipitation; from melts or liquids, by cooling or chemical precipitation; and from solutions in water or other solvents by evaporation of the solvents or by chemical precipitation. The height of the temperature and the amplitude of the thermal vibration occasioned by the temperature which opposes the electrostatic attraction of the nuclei electrons, results in the fact that the atoms, ions, or molecules in gasses fly through one another in a confused matter; in melts, liquids, and solutions, they swarm through one another and through particles of the solvent irregularly; and finally in solid crystals execute only pendular movements about a position of equilibrium. Upon solidification of the crystal, below or at its melting point, the bonding of the atoms, ions, or molecules into regular crystal-lattices is effected, preceded by liberation of the heat of fusion. Only after the liberation of this quantity of heat can the bonding forces overcome the thermal vibration forces and bring about crystallization.

Thinly liquid melts, that is, the so-called homogeneous melts are formed by heating crystalline substances to a particular temperature and for a particular time. The crystal lattice structures of these substances collapse at definite melting points if the requisite quantity of heat of fusion has passed into the crystalline material. Upon slow cooling of these melts, the heat of fusion is given up upon reaching the melting point and the regular assembly of the atoms, ions or molecules, is again effected to form the crystal-lattices under the influence of the electrostatic bonding forces. If the cooling is carried out very quickly, crystallization does not occur upon passing through the melting point, but at a much lower temperature, with a sudden liberation of the heat of fusion. This is called spontaneous crystallization of an undercooled melt or liquid.

Finally, there must be considered the third form of materials, which are those non-crystalline or amorphous materials which have no definite melting point. When certain vitrifiers in definite well-known proportions are mixed and melted together and rapidly cooled, the internal friction, that is, the cohesive force of the viscous liquid, holds fast the wildly churning motion of the atoms, ions or molecules in the place where they are located at the moment of undercooling, the electrostatic forces of the atomic nuclei being insufficient to overcome this cohesion thereby failing to effect crystallization. Into this category fall the well-known glasses and glass-like substances. Such materials are completely different from the original constituents with materially altered chemical reactivity, changed physical behavior and an indefinite transformation point between the rigid condition and the viscous condition, as well as an indefinite melting point between the viscous condition and the thinly liquid condition. The internal state of stress between the attracting forces of the atomic nuclei, together with a latent heat of fusion in the glass, involves an unstable condition which urges towards crystallization. Acceleration of the conversion can be brought about by the addition of crystallization seeds or nuclei to the cooling melt. Such a process effects spontaneous crystallization and is known as devitrification.

All solid substances of the earth form either unstable, glass-like amorphous substances or stable crystalline materials which may have a space-lattice or a layer-lattice structure.

The lattice planes of a crystal are occupied by atoms or ions of the elements which are held together by chemical combination. When chemically different crystals come together, the atoms or ions of which are formed with elements which have greater affinity, that is, to say, a greater attractive force, toward the elements in the adjacent crystal than to those in their own crystal, there is then effected with the interchange of the elementary members of the crystals, a transformation of their structure, form and properties known as a chemical reaction. The higher the temperature before the transformation, the more quickly the reaction takes place.

When a metallic material is involved, the ions formed by the same are charged with varying electrical voltages which are compared to the voltage of the hydrogen ion in the well-known electro-chemical contact voltage series. This series may be regarded as a measurement of the greater or smaller affinity of an element for oxygen as compared with hydrogen as a base.

Oxygen gas is present everywhere on the earth and the most frequent chemical reactions between the elements, particularly in a heated condition, therefore take place with oxygen. In the case of metals, oxidation is known as scaling. This occurs, for example, with steel or iron heated to an elevated temperature where the iron ions of the surface crystals combine with the oxygen ions of the atmospheric oxygen. The higher the temperature of the metal, the more rapidly are the iron ions released from the metal crystal-lattice to combine with the oxygen ions and thereby form new crystals of ion oxide. Owing to this loss of iron ions, the surface of the metal becomes rough and porous. Since iron has three different valencies, three different iron oxide crystal-lattices can be formed. The first oxide to form is FeO. Oxygen ions have a large radius and iron ions a comparatively small one. In the FeO crystals therefore, the oxygen ions form a crystal-lattice structure of coarse mesh. Through this coarse mesh, further iron ions can diffuse from the metal surface to the atmospheric oxygen without great difficulty. When the layer of FeO has attained a certain thickness, the number of iron ions diffusing decreases and the oxygen ions which are then present in a surplus combine with the diffusing iron ions to form $Fe_3O_4$ crystal-lattices. In this material, the oxygen ions are more closely packed and more numerous than in the lattice of the FeO material. The $Fe_3O_4$ lattice is therefore more closely meshed and allows fewer iron ions to diffuse therethrough. When the $Fe_3O_4$ crystals have obtained a particular layer thickness, the number of iron ions still diffusing is so greatly diminished that the oxygen ions present now combine with the iron ions to form $Fe_2O_3$ crystal-lattices which are more closely meshed than either of the previous iron oxides and therefore allow hardly any iron ions to pass through its layer. The diffusion of iron ions is therefore practically braked and the scaling operation ceases.

Care must be taken not to have among the iron oxides scale oxides of metals which have a smaller affinity for oxygen than the iron, since this would increase this scaling, the iron ions travelling through any intermediate alloyed metal oxides layer, stripping the same of oxygen, and leaving layers of pure metal beneath the iron oxide scale.

Generally speaking, the metal oxides are electrically conducting. The conductivity is a measure of the speed of the diffusion of the hot metal ions through their layer. It is therefore a measure of the speed of oxidation of the surface of the metal. The conductivity depends however upon the closeness of mesh of the metal oxide crystal-lattices, that is, upon the number of ions in the lattice, and upon their radius. Heated metal surfaces are therefore most reliably rendered passive by the oxides of the same metal, for the metal ions contained in its crystal-lattice have the same radius and the same affinity as the metal ions that might be travelling out from the hot metal surface.

When a hot metal surface is to be effectively protected against oxidation, for example, when a metal is being shaped at a high temperature, it may be best protected by coating its surface before the oxygen from the surrounding air can attack the same to form a scale, with a dense, uniformly thick, artificially produced coating of crystals of the oxide of the metal being deformed or of materials having kindred space-lattice structures. The crystalline space-lattice structures of such a compact, artificially produced protective coating of uniform thickness can alone, as compared to layers of glass-like, amorphous, viscous materials or mixtures of such materials with layer-lattice crystalline materials which form very porous protective coatings, of unequal thickness, effectively brake the diffusion of the metal ions to the atmospheric oxygen and thereby maintain the product surface smooth.

If this artifically produced protective layer contains not only the oxides of the metal to be protected, but also the oxides of other metals, then it must not contain among these other oxides any oxide crystals of metal which would have a lower affinity for oxygen than the metal being deformed since, as pointed out above, such materials would increase, rather than decrease scaling. Further the overall mixture utilized to form the protective coating, which may include some non-crystaline substances, must be plastically deformable rather than viscous at the deforming temperature and must result in a space-lattice crystalline coating on the product.

Since metal oxdies are of a space-lattice structure held together in all directions in space by forces of attraction, they may be plastically deformed in the same manner as the space-lattice crystals of the metals to be extruded. In such a plastic deformation, they still preserve their crystalline space-lattice arrangement which is only stressed elastically while still being held together by the disturbed lattice structures in which the atoms or ions are hooked into one another, thereby stabilising the deformed condition. Such space-lattice crystals in an extruded coating formed by mixtures of crystalline and non-crystalline materials in various proportions, depending upon the temperature of the deformation process, are particularly adapted for forming the coating on the metal product compact and uniform as a result of the deformation.

Space-lattice crystalline materials have a resistance to deformation which is practically unaltered by the rise in temperature of the metal during the deformation process. This is so because the mutual attraction of the atoms or ions in the lattices are not overcome by the vibration forces caused by the elevated temperature. Conversely, the resistance to deformation of lubricants having layer-lattice structure is almost nil parallel to the plane of the lattice and is constantly changing in value as the angle of the layer planes is varied during the deformation procedure. This gives rise to protective coverings of unequal thickness. With viscous or glass-like materials the diminution of the forces of cohesion between the atoms, ions or molecules is proportional to the rise of the temperature caused by the deformation and is therefore very great which also gives rise to defective coatings or unequal thicknesses.

Various space-lattice crystalline materials such as metal oxide crystals and metal silicate crystals have a thermal conductivity which decreases with a rise in temperature. On the other hand, amorphous glass-like substances have a thermal conductivity which increases with a rise in temperature. If, in a deformation operation, the shaping tools are to be protected against excessive heating by the hot billet and against excessive wear by the frictional action of the deformed metal or by a protective coating interposed between the tools and the metal, the thermal conductivity of the material must be as small as possible and must not rise, but rather must become smaller upon a rise in temperature of the deformation. The coating material must therefore consist primarily of crystalline powders which do not lose their heat protective value as the temperature increases. Also, the coating must have a constant resistance to deformation which does not vary substantialy during the temperature rise, thereby acting as a good antifriction medium. This deformation resistance must, for the protection of the die, be of the order of the magnitude of the deformation resistance of the metal being deformed in order to provide a protective coating of constant thickness between the deformed metal and the die. Therefore, it must not lose its crystalline structure and plastic deformability. However, it must be able to acquire a deformation resistance which for the protection of the tool must be slightly lower than the deformation resistance of the metal being deformed to enable it to distribute itself between the metal and the tool under the same pressure operating on the metal. Therefore, while the major portion of the compound lubricant should remain as space-lattice crystalline powder grains, it may also contain some crystalline or non-crystalline material or materials which become liquid or viscous during the deformation operation but which immediately solidify in crystalline form on the deformed product or which are constrained by the crystalline material to spontaneously crystallize on the product. The quantitative ratio of the materials within the coating must be so selected that the mixture as a whole becomes plastically deformable at the deformation temperature without becoming viscous.

Many instances have been suggested heretofore for incorporating amorphous compounds or mixture such as glass or the like intermediate a shaping tool and the billet being deformed, such material functioning as a lubricant and simultaneously coating the deformed metal product with an antioxidation layer. However, as pointed out hereinabove, the use of such materials has numerous disadvantages. Glasses or glass-like substances will become viscous in contrast to being plastically deformed at the elevated temperature at which the deformation procedure is taking place. The layer formed by such lubricants is, of course, not of a crystalline nature and is generally uneven thereby providing poor protection from oxidation. Further, the thus-formed coating is extremely tenacious, being very difficult to remove from the deformed product. In fact, the conventional removal procedures which includes such mechanical methods as sandblasting or the like and such chemical procedures as pickling tend to produce a surface on the product which is rough and partly pitted thereby decreasing whatever advantage had been obtained from the protective procedure in the first place.

Other materials suggested for similar uses heretofore have also had numerous disadvantages. For example, the use of mica in the form of micro-mica, talc, borax, felspar, alumina in the form of bentonite, etc. have all been suggested, but each fail in one way or another to provide adequate lubrication and a protective coating on tthe product. Phyllosilicates such as serpentine asbestos, crysotil asbestos, mica, alumina or the like which are layer-lattice materials have the various inherent disadvantages pointed out hereinabove. During deformation of steel, graphite will result in marginal recarburization. Thus, it can be seen that although those skilled in this art have been searching for an optimum material which will function in the manner described, such results have not heretofore been realized.

It is therefore a primary object of this invention to provide methods for protecting a heavy metal undergoing deformation against oxidation or scaling and to simultaneously reduce friction between the billet and the shaping tool, which are free from the foregoing, and other, disadvantages.

A further objective of the instant invention is the provision of a deformed heavy metal product produced by such processes.

Yet another objective of this invention is the provision of methods of the type described which result in an interfacial lubricating layer between the workpiece being deformed and the tool, and a loosely adhering, readily removable, uniformly dense, antioxidation coating on the deformed metal product. In accordance with such procedures the coating thus formed may be readily removed by simple stretching or drawing of the workpiece or by other non-destructive mechanical or chemical procedures frequently forming a conventional part of the further processing of such deformed products.

Other and further objects reside in the specific manipulative steps utilized in the processes, in the composition and quantitative relation of the constituents of the materials utilized and in the characteristics and properties of the product produced thereby.

Still other objects will in part be obvious and in part be pointed out as the description of tthe invention proceeds and as shown in the accompanying drawing wherein:

FIGURES 1–3 illustrate various steps in the production of a tube utilizing a piercing appliance;

FIGURE 4 illustrates the operation of a piercing mill; and

FIGURE 5 illustrates the action of a punching press.

It will be understood that the instant inventive concept is applicable to any procedure for the deformation of a heavy metal workpiece, various conventional shaping operations being carried out by well-known extruders, piercing appliances and mills, pilgrim rolling mills, continuous tube-rolling mills, punching presses, shaping or slotting benches with drawing dies and the like during which procedure the workpiece attains an elevated temperature either by being heated from without or under the influence of the pressure occurring during deformation.

Consistent with the above, the basic procedure of this invention comprises introducing a powder mixture between the workpiece and the shaping tool at the elevated temperature and before the deformation procedure, deforming the workpiece, and simultaneously plastically deforming the powder mixture so that the powder mixture defines the lubricating layer between the workpiece and the tool and results in the antioxidation coating on the product. In order to realize the desired results, it is important that the powder mixture include crystalline components having a space-lattice crystalline structure, with at least an effective proportion of the crystalline components being oxides of metals having an affinity for oxygen at least as great as the metal deformed and including oxides of the metal being deformed themselves, all of the oxides having definite melting points at least one of these melting points being above the elevated temperature occurring during deformation, with the powder mixture including components rendering the same plastically deformable in contrast to merely viscous at the elevated temperature. The quantitative ratio of the constituents of the powder mixture must be such as to result in a space-lattice crystalline coating on the product.

Basically, the powder mixture may include a large proportion of space-lattice crystalline components having their melting points above the elevated temperature of deformation, and further primarily space-lattice crystalline components having definite melting points in the vicinity of the elevated temperature in a quantitative ratio to produce a plastically deformable material at the said temperature. Alternatively, the melting points of all of the components of the powder mixture may be so slightly above the shaping temperature as to render the powder mixture plastically deformable under those conditions. Additionally, the powder mixture may include a material having a melting temperature or range substantially below the deformation temperature in a quantitative ratio as to produce a plastically deformable substance at the elevated temperature. It is also contemplated to include in the powder mixture one or more components having an amorphous structure, but such materials must be included with a quantitative ratio of space-lattice crystalline components great enough to devitrify the amorphous constituents forcing spontaneous crystallization of the same on the deformed metal product.

Depending upon the particular type of deformation procedure being practiced, it will be found advisable to vary the composition of the powder mixture in order to produce certain desired results. For example, for the protection of the end faces of a punch and the edges of a drawing die it is preferable to use a powder mixture with substantially all space-lattice crystalline components having melting points above the deformation temperature, all of the components being plastically deformable at the elevated temperature, but only slight plasticity being necessary. For the protection of mandrels of extruders, piercing appliances, piercing mills, pilgrim rolling mills, continuous tube-rolling mills, punches, shaping and slotting benches, and the protection of containers it is advisable to include among the space-lattice crystalline components at least one material and preferably a large proportion of materials which are converted into the liquid phase at the elevated temperature in order to bind together the non-melting heated space-lattice crystal powder particles of the mixture to form a plastic, highly malleable composition.

If amorphous or glass-like material is to be used instead of space-lattice crystalline materials, a composition is selected in which this amorphous component of the primarily space-lattice crystalline mixture becomes liquid at the temperature occurring during deformation, and in so doing forms very finely divided drops of liquid in the mixture of the solid space-lattice crystalline grains of powder that are merely plastically deformed. The amorphous vitreous structure of the glass-like portion of the composition, owing to an appropriately high proportion of crystalline metallic oxides or workpiece metallic oxide grains of the powder which do not dissolve or melt and which, in a very fine state of distribution, surround all the other powder grains, is constrained upon cooling to crystallize spontaneously upon the finished product and in so doing loses the glass-like appearance and properties in the antioxidation film. This composition is preferred to lubricate mandrels and containers of extruders.

One such example of material according to this embodiment of the invention is the use of the following composition during the extrusion of steel:

A space-lattice crystalline powder, 2.5 to 10% $Fe_2O_3$.
An amorphous glass powder, 31 to 33% $Na_2O \cdot 60$ to 65% $B_2O_3$.

According to a further feature of the instant invention, the metallic oxide portion of the powder mixture includes an oxide of a metal having a plurality of valencies which disassociates at the temperature of the deformation and in so doing gives off oxygen in small quantities. This gives rise to additional sliding ability and particularly good plasticity owing to the change in the crystalline structure which is the result of the removal of one oxygen atom from the crystal lattice. When extruding steel, for example, the use of $Fe_2O_3$ is preferred since this oxide disassociates to form $Fe_3O_4$ plus oxygen, the oxygen liberated reducing the adherence of the oxidation layer to the deformed product by formation of a fine oxide haze on the workpiece and by expansion after the deformation operation thereby swelling the antioxidation layer and increasing the surface tension of the same. This is especially important for lubrication of extrusion mandrels.

The layer or coating pressed onto the internal surface of an extruded hollow product has a very high intermolecular attraction with high surface tension and interfacial tension thereby resulting in only slight adhesion to the deformed metal product surface. During the cooling of the product the coating layer partially agglomerates to form small balls, a free residue of the metal oxide crystalline powder, for example, $Fe_3O_4$, remaining as a powder layer on the surface of the metal. This effect is realized, for example, when using a mixture containing 97 percent sodium borosilicate and 2.5 percent $Fe_2O_3$. The small balls thus formed easily spring off and the powder layer can be wiped off the deformed product should this be necessary for further working of the same.

In the case of the primarily space-lattice crystalline powder mixture, a portion of the workpiece metallic oxide may be replaced by a chemical compound which has originated from the workpiece metal oxide with another metallic oxide and possesses a similarly high melting point as well as kindred space-lattice crystalline structure. On extruding steel, for example, at a billet temperature of approximately 1100° C., $FeSiO_3$ having a melting point of 1140° C. or $Fe_2SiO_4$ having a melting point of 1270° C. can be utilized.

Various space-lattice crystalline materials of mineralogical or synthetic origin are found to be of particular advantage in the powder mixture of this invention. Crystalline pumice powder having from 55 to 72 percent $SiO_2$, from 12 to 22 percent $Al_2O_3$, from 5 to 6 percent $K_2O$, from 4 to 5 percent $Na_2O$, and from 0.5 to 3 percent $Fe_2O_3$ is one such material. Particularly suitable from a technical and cost standpoint is the use of certain space-lattice crystalline asbestos powders such as a crystalline amosite powder having approximately 50 percent $SiO_2$, approximately 32 percent FeO, approximately 8 percent $Fe_2O_3$, approximately 4 percent MgO, approximately 4 percent $H_2O$, the rest being alkalis, or a space-lattice crystalline Kapland blue asbestos powder having approximately 51 percent $SiO_2$, approximately 36 percent FeO, approximately 2 percent MgO, approximately 4 percent $H_2O$, the rest being alkalis.

For various reasons certain metallic oxides should be avoided when composing the powder mixture of this invention. For example, those materials which would undergo a chemical reaction with a metal workpiece should not be utilized. Such oxides include the oxides of metals which have a lesser affinity for oxygen than the metal being deformed as explained hereinabove. Also, the use of metallic oxides which would cause intercrystalline corrosion in the metal being deformed should be excluded. Exemplary of such materials is lead oxide in the deformation of steel. Additionally, metallic oxides or other substances which would accelerate the diffusion of the oxygen into the deformed metal during the relatively short time of contact in the course of cooling of the same, or even diffuse themselves into the metal, should be avoided. For example, in the extrusion of steel, oxides of nickel, copper, cobalt and molybdenum should not be present. Likewise, substances not belonging to the metal oxides which give off oxygen, nitrogen or sulphur dioxide gasses are preferably excluded. As pointed out hereinabove, in the extrusion of a steel which would not tolerate marginal recarburization, additions of graphite are inadvisable.

The thickness of the coating layer is determined by the relative grain sizes of the powder mixture, relatively larger grain sizes being utilized for the production of a relatively thicker coating. In order to avoid an undesirably thick layer and to insure smooth passing of the same through the shaping tools, the mixture preferably should not contain grain sizes of more than 0.3 mm. Obviously, in order to produce a particularly thin layer on the deformed metal product, smaller grain sizes are to be used.

Consistent with the teachings hereof, the composition may be utilized in the form of a powder mass, a paste or a preformed structure such as a disc or the like. The only essential step is that the same be introduced between the shaping tool and the workpiece, heated at the elevated temperature of deformation. The powder masses, pastes, or preformed structures may be manufactured from the fine grained powder-like metallic oxide and other components with binding means such as waterglass added, if desired. The preformed structures may be separately processed by a pressing operation before being introduced between the metallic billet and the deformation tool.

The powder mixture is pressed out as a compact, thin, interfacial layer between the metal being deformed and the shaping tool and applies itself as a thin, cohesive coating to the deformed metal to protect the same from oxidation. The coating is of a space-lattice crystalline structure and is readily removed from the deformed metal product by stretching or the like as set forth above. This procedure detaches the coating layer resulting in a completely smooth unpitted surface on the deformed metal product. In the event a stretching operation is not to be encountered as a conventional part of the further processing of the product, a brief surface heating such as stroking the surface with a gas burner flame, will readily detach the coating layer leaving behind a smooth surface.

Although the use of the powder mixtures of this invention in other deformation procedures will be obvious to one skilled in the art, illustrative examples of the same are shown in the drawing. A billet 1 shown in FIGURE 1 is passed between a pair of rolls 2 as illustrated in FIGURE 2 to produce a tube 5. The inner and outer surfaces of this hollow profile tube are normally sensitive to oxidation. So long as the tube is still closed at one end as in FIGURE 2, not much oxygen can enter the same. However, as soon as the tube is open at both ends as illustrated at 8 in FIGURE 3, air or oxygen can flow through it. Thus, in order to prevent oxidation of the inner surfaces of the tube under these circumstances, the powder mixture of the instant invention is blown into the tube by means of a blowing heat 6 as the tube is conveyed away on the roller bed 7.

With a piercing mill as illustrated in FIGURE 4, the tube 8 is carried between the mandrel 9 and the rolls 10. For the protection primarily of the mandrel, the tube 8 has been dusted internally in the manner of FIGURE 3 with one of the lubricants described.

FIGURE 5 illustrates the piercing of a billet 11 which is inserted in a container 12. An ejector is seen at 13. The billet initially extends up to the level 14, but after the punch 15 is forced in from above to the position shown in dotted lines at 16, the billet material is displaced upwardly to the level 17. During the insertion of the punch 15, the billet is provided with one of the powder mixtures externally at first so that the same can serve to lubricate the surfaces between the billet and the container 12. After expulsion of the pierced billet, the powder serves as a protection against oxidation. Upon the surface 14 of the billet, a powder according to this invention may be applied either in a loose or bound form thereby serving first to lubricate the mandrel 15 as the same is forced downwardly and then to protect the internal surface of the hollow billet against oxidation.

Various other procedures for utilization of the instant inventive concept are not shown in the drawing, it being understood that the operations illustrative are exemplary of many uses of the instant inventive concept.

Although the composition of the powder mixture may be readily varied within the teachings of this application depending upon the particular material being deformed, the temperature of the deformation procedure, and the particular type of deformation being undergone, Table I below discloses generically various categories of each of these variables and suggested ranges for the components of the powder mixture. Although various symbols have been utilized to indentify the chemical compositions of the constituents, it is to be understood that these symbols are set forth without regard to the valencies of the chemical elements.

TABLE 1.—TEMPERATURE ZONES FOR THE DEFORMATION OF METALS AND THEIR ALLOYS

| Group | Name of metal or alloy being deformed | Basic metal | | Deformation temperature |
|---|---|---|---|---|
| | | Name | Weight percent in metal being deformed | |
| 1 | C- and alloy steels including high temperature steels. | Fe | 14–99.8 | 1100–1250 |
| 2 | High temperature steels. | Ni | 46–73 | 1100–1250 |
| 3 | ...do... | Co | 40–73 | 1100–1250 |
| 4 | Nickel-silver | Cu | 48–70 | 700–930 |
| | Ni-Al-bronzes | Cu | 85–92 | |
| | Al-bronzes | Cu | 93–95 | |
| | Tin-bronzes | Cu | 76–90 | |
| | Si-copper | Cu | 96 | |
| | Pure copper | Cu | 100 | |
| 5 | Tin-bronzes | Cu | 58–64 | 650–810 |
| | Brasses | Cu | 56–67 | |
| | Al-bronzes | Cu | 90–92 | |
| | Nickel-silver | Cu | 41–45 | |
| 6 | Copper-nickel | Cu | 71–75 | 980–1150 |
| | ...do... | Cu | 60–70 | |
| | ...do... | Cu | 28–30 | |
| 7 | Heat resisting alloys | Cr | 99–100 | 1150–1250 |
| 8 | ...do... | {Nb= Cb} | 78–100 | 1250–1700 |
| 9 | ...do... | Mo | 99.43–100 | 1300–1850 |
| 10 | ...do... | Ta | 90–100 | 1400–1850 |
| 11 | ...do... | W | 100 | 1600–2200 |

TERMS AND SYMBOLS FOR POWDER MIXTURES

[60 to 300 μ or 0.06 to 0.3 mm grain size]

| Group | Component 1 | | Component 2 | | Component 3 | |
|---|---|---|---|---|---|---|
| | MO or MO.MO mixture of this | | MO.MO.SiO or mixture of this | | MO.MO or MO.SiO or MO.MO.SiO or MO.BO or MO.PO or M.Cl or mixture of this | |
| | Melting Temperature, °C. | Weight Percent | Melting Temperature, °C. | Weight, Percent | Melting Temperature, °C. | Weight, Percent |
| 1 | 1600 | 0.5–49 | 1090–1400 | 0–99.5 | 880 | 0–99.5 |
| 2 | 1600 | 0.5–49 | 1090–1400 | 0–99.5 | 880 | 0–99.5 |
| 3 | 1600 | 0.5–49 | 1090–1400 | 0–99.5 | 880 | 0–99.5 |
| 4 | 1150 | 0.5–49 | 690–950 | 0–99.5 | 650 | 0–99.5 |
| 5 | 990 | 0.5–49 | 640–850 | 0–99.5 | 550 | 0–99.5 |
| 6 | 1300 | 0.5–49 | 970–1190 | 0–99.5 | 725 | 0–99.5 |
| 7 | 1600 | 0.5–49 | 1140–1400 | 0–99.5 | 900 | 0–99.5 |
| 8 | 2200 | 0.5–49 | 1240–1720 | 0–99.5 | 1200 | 0–99.5 |
| 9 | 2430 | 0.5–49 | 1290–1880 | 0–99.5 | 1250 | 0–99.5 |
| 10 | 2430 | 0.5–49 | 1390–1880 | 0–99.5 | 1300 | 0–99.5 |
| 11 | 2700 | 0.5–49 | 1590–2220 | 0–99.5 | 1500 | 0–99.5 |

LEGEND:
MO = Metallic oxide
MO.MO = Chemical compound of 2 metallic oxides
MO.SiO = Chemical compound of 1 metallic oxide with 1 silicon oxide (including amorphous forms)
MO.MO.SiO = Chemical compound of 2 metallic oxides with 1 silicon oxide (including amorphous forms)
MO.PO = Chemical compound of 1 metallic oxide with 1 phosphorous oxide
MO.BO = Chemical compound of 1 metallic oxide with 1 boron oxide (including amorphous forms)
M.Cl = Chemical compound of metal with chlorine It will be seen from the above table that it is advisable in each instance to utilize as a first component from 0.5 to 49 percent of a space-lattice crystalline metallic oxide material which, although not specifically pointed out in the table, preferably has from 0.5 to 45 percent of the oxides of the metal being deformed, the remainder of the metallic oxides having an affinity for oxygen at least as great the metal being deformed and all of the oxides having a definite melting point above the deformation temperature. From 0 to 99.5 percent of a second component the major constituents of which have a space-lattice crystalline structure, but which may include certain amorphous materials, and which have a melting range in the vicinity of the deformation temperature is utilized as is from 0. to 99.5 percent of a third component having a melting temperature below the deformation temperature. Consistent with the above teachings, the quantitative ratio between these components is selected to provide the over-all powder mixture with plastic deformability at the deformation temperature, the ratio between crystalline and amorphous materials being such as to cause spontaneous crystallization of the latter on the deformed metal product.

Table 2 below discloses specific examples of powder mixtures utilizable in particular deformation procedures to further illustrate the instant inventive concept, it being understood that these examples are merely exemplary of many variations and therefore are not to be interpreted as limiting.

From the analyses of the space crystalline components 2, as for example, amosite and Kapland blue, asbestos, supra, it appears that there is already contained in each of these materials from 36 to 46% iron oxide compounds. This percentage of press metal oxides can be increased in the total mixture as component 1 as desired by the addition of pure iron oxides.

TABLE 2

| Example | Deformation metal | Deformation temperature, °C. | Deformation ratio | Exit speed, m./s. | Type of product |
|---|---|---|---|---|---|
| 1 | C-steel, St 50 | 1250 | 20 | 5 | Hollow profile. |
| 2 | Stainless steel, 18/10 | 1180 | 21.7 | 2 | Tube. |
| 3 | Stainless steel, 18/8 | 1130 | 15 | 4 | Do. |
| 4 | C-steel, St 37 | 1250 | 20 | 5 | Full profile. |
| 5 | C-steel, St 35.8 | 1265 | 30 | 5 | Fin-tube profile. |
| 6 | do | 1265 | 15 | 5 | Do. |
| 7 | Monel | 1120 | 10 | 0.25 | Tube. |
| 8 | C-steel, St 50, die-forging piece. | 1250 | | | Crankshaft. |
| 9 | C-steel | 1255 | | | Tube. |

| Example | For Matrices | | | | For Mandrels | | | |
|---|---|---|---|---|---|---|---|---|
| | Component | Wt., Percent | Chemical Formula | Melting Temperature, °C. | Component | Wt., Percent | Chemical Formula | Melting Temperature, °C. |
| 1 | 1<br>2<br>3<br>3 | 2.5<br>90<br>5<br>2.5 | $Fe_2O_3$<br>Pumice<br>$Na_2Si_2O_5$<br>$Na_2B_4O_7$ | 1565<br>1200<br>874<br>878 | 1<br>2<br>3 | 2.5<br>95<br>2.5 | $Fe_2O_3$<br>Pumice<br>$Na_2B_4O_7$ | 1565<br>1200<br>878 |
| 2 | 1<br>2<br>3 | 2.5<br>75<br>22.5 | $Fe_2O_3$<br>Amosite asbestos.<br>$Na_2Si_2O_5$ | 1565<br>1400<br>874 | 1<br>2<br>3<br>3 | 2.5<br>37.5<br>40<br>20 | $Fe_2O_3$<br>Pumice<br>NaCl<br>$Na_2B_4O_7$ | 1565<br>1200<br>770<br>878 |
| 3 | 1<br>2<br>3 | 2.5<br>88.5<br>9 | $Fe_2O_3$<br>Amosite asbestos.<br>$Na_2Si_2O_5$ | 1565<br>1400<br>874 | | | | |
| 4 | 1<br>2<br>3 | 2.5<br>88.5<br>9 | $Fe_2O_3$<br>Amosite asbestos.<br>$Na_2Si_2O_5$ | 1565<br>1400<br>874 | | | | |
| 5 | 1<br>2<br>3<br>3 | 10<br>65<br>16<br>9 | $Fe_2O_3$<br>Pumice<br>$Na_2B_4O_7$<br>$Na_2Si_2O_5$ | 1565<br>1200<br>878<br>874 | 1<br>2<br>3 | 10<br>72<br>18 | $Fe_2O_3$<br>Pumice<br>$Na_2B_4O_7$ | 1565<br>1200<br>878 |
| 6 | 1<br>2<br>3<br>3 | 2.5<br>90<br>2.5<br>5 | $Fe_2O_3$<br>Pumice<br>$Na_2B_4O_7$<br>$Na_2Si_2O_5$ | 1565<br>1400<br>878<br>874 | 1<br>2<br>3<br>3 | 2.5<br>37.5<br>20<br>40 | $Fe_2O_3$<br>Pumice<br>$Na_2B_4O_7$<br>NaCl | 1565<br>1400<br>878<br>770 |
| 7 | 1<br>2<br>3<br>3 | 2.5<br>57.5<br>32.5<br>7.5 | $Cu_2O$<br>Pumice<br>$Na_2Si_2O_5$<br>$Na_2B_4O_7$ | 1230<br>1200<br>874<br>878 | 1<br>2<br>3<br>3 | 2.5<br>27.5<br>25<br>45 | $Cu_2O$<br>Pumice<br>$Na_2B_4O_7$<br>NaCl | 1230<br>1200<br>878<br>770 |
| 8 | 1<br>2<br>3<br>3 | 1.5<br>18.5<br>30<br>60 | $Fe_2O_3$<br>Pumice<br>$Na_2B_4O_7$<br>NaCl | 1565<br>1200<br>878<br>770 | | | | |

| Example | For Receivers | | | | For Roll-plugs | | | |
|---|---|---|---|---|---|---|---|---|
| 1 | 1<br>2<br>3 | 2.5<br>95<br>2.5 | $Fe_2O_3$<br>Pumice<br>$Na_2B_4O_7$ | 1565<br>1200<br>878 | | | | |
| 2 | 1<br>2<br>3<br>3 | 2.5<br>37.5<br>40<br>20 | $Fe_2O_3$<br>Pumice<br>NaCl<br>$Na_2B_4O_7$ | 1565<br>1200<br>770<br>878 | | | | |
| 5 | 1<br>2<br>3 | 10<br>72<br>18 | $Fe_2O_3$<br>Pumice<br>$Na_2B_4O_7$ | 1565<br>1200<br>878 | | | | |

TABLE 2—Continued

| Example | For Matrices | | | | For Mandrels | | | |
|---|---|---|---|---|---|---|---|---|
| | Component | Wt., Percent | Chemical Formula | Melting Temperature, °C. | Component | Wt., Percent | Chemical Formula | Melting Temperature, °C. |
| 6 | 1 | 2.5 | Fe₂O₃ | 1565 | | | | |
| | 2 | 37.5 | Pumice | 1400 | | | | |
| | 3 | 20 | Na₂B₄O₇ | 878 | | | | |
| | 3 | 40 | NaCl | 770 | | | | |
| 7 | 1 | 2.5 | Cu₂O | 1230 | | | | |
| | 2 | 27.5 | Pumice | 1200 | | | | |
| | 3 | 25 | Na₂B₄O₇ | 878 | | | | |
| | 3 | 45 | NaCl | 770 | | | | |
| 9 | | | | | 1 | 2 | Fe₂O₃ | 1565 |
| | | | | | 3 | 98 | NaCl | 770 |

Thus, it will be seen that there is herein provided an improved procedure for protecting shaping tools and metal products being shaped which satisfies all of the objectives of the instant invention, and others, including many advantages of great practical utility and commercial importance.

Since many embodiments may be made of the instant inventive concept, and since many modifications may be made of the embodiments hereinbefore shown and described, it is to be understood that the foregoing is merely illustrative of this invention and that the concept hereof is to be only limited by the appended claims. Accordingly,

What is claimed is:

1. In a process of physical deformation of a heavy metal workpiece by a tool accompanied by attainment of an elevated temperature by the workpiece, the improvement which comprises protecting the deformed metal product from oxidation by the oxygen of the cooling air and protecting the tool from frictional wear by introducing a powder mixture between the workpiece and the tool at the elevated temperature and before the deformation procedure, said powder mixture including crystalline components having a space-lattice crystalline structure, at least an effective proportion of said crystalline components being oxides of metals having an affinity for oxygen at least as great as the metal being deformed and oxides of the metal being deformed, each of said oxides having a definite melting point, at least one of these melting points being above the elevated temperature and said powder mixture including components which render the same plastically deformable at the elevated temperature, deforming the workpiece, and simultaneously plastically deforming said powder mixture so that said powder mixture defines an interfacial lubricating layer between the workpiece being deformed and the tool, and a loosely adhering, readily removable, uniformly dense, space-lattice crystalline antioxidation coating on the deformed metal product.

2. The process of claim 1 wherein the heavy metal is steel and said powder mixture includes Fe₂O₃.

3. The process of claim 1 wherein the workpiece is being physically deformed by pressing the same through an extrusion die, and said powder mixture is introduced between the workpiece and the extrusion die.

4. The method of claim 1 wherein the interior surfaces of a tubular deformed metal product are to be protected from oxidation, said powder mixture being blown into the tubular product to coat the interior surfaces.

5. The method of claim 1 wherein in a piercing mill utilizing a tubular metal workpiece, said powder mixture is introduced into the interior of the same prior to engagement with a mandrel.

6. The method of claim 1 wherein in a punching press said powder mixture is introduced between said workpiece and the container and between said workpiece and the mandrel.

7. The process of claim 1 wherein said powder mixture further includes components having an amorphous structure, the quantitative ratio of space-lattice crystalline components to amorphous components being such as to devitrify the amorphous components forcing spontaneous crystallization of the same on the deformed metal product during cooling.

8. The process of claim 7 wherein the workpiece is being physically deformed by pressing the same through an extrusion die, and said powder mixture is introduced between the workpiece and the extrusion die.

9. The method of claim 7 wherein the interior surfaces of a tubular deformed metal product are to be protected from oxidation, said powder mixture being blown into the tubular product to coat the interior surfaces.

10. The method of claim 7 wherein in a piercing mill utilizing a tubular metal workpiece, said powder mixture is introduced into the interior of the same prior to engagement with a mandrel.

11. The method of claim 7 wherein in a punching press said powder mixture is introduced between said workpiece and the container and between said workpiece and the mandrel.

12. The method of claim 1 wherein for the protection of the end faces of a punch and the edges of a drawing die, said space-lattice crystalline components include only materials having melting points slightly above the elevated temperature, all of said materials being plastically deformable at the elevated temperature.

13. The method of claim 1 wherein for the protection of the mandrels of piercing appliances, piercing mills, pilgrim rolling mills, continuous tube-rolling mills, punches, and shaping and slotting benches, said space-lattice crystalline components include at least one material having a melting point below the elevated temperature whereby said powder mixture is readily plastically deformable at the elevated temperature without becoming liquid.

14. In a process of physical deformation of a heavy metal workpiece by a tool accompanied by attainment of an elevated temperature by the workpiece, the improvement which comprises introducing a powder mixture between the workpiece and the tool at the elevated temperature and before the deformation procedure, said powder mixture including from about 0.5 to 49 percent of a first component, the constituents of which have space-lattice crystalline structure and including from 0.5 to 45 percent of oxides of the metal being deformed and the remainder of oxides of metals having an affinity for oxygen at least as great as the metal being deformed, each of said oxides having a definite melting point, at least one of these melting points being above the elevated temperature, said powder mixture further including from about 0 to 99.5 percent of a second component the major constituents of which have a space-lattice crystalline structure and a definite melting point in the vicinity of the elevated temperature and said powder mixture further including from about 0 to 99.5 percent of a third component the major constituents of which have a space-lattice crystalline structure and a definite melting point and which melt at a temperature substantially below the elevated temperature, said components being present in said powder mixture in a quantitative ratio rendering said powder mixture plastically deformable at the elevated temperature, deforming the workpiece, and simultaneously plastically deforming said powder mixture so that said powder mixture defines an interfacial lubricating layer between the workpiece and the tool, and a loosely adhering, readily removable, uniformly dense, space-lattice crystalline antioxidation coating on the deformed metal product.

15. The process of claim 14 wherein the workpiece is being physically deformed by pressing the same through an extrusion die, and said powder mixture is introduced between the workpiece and the extrusion die.

16. The method of claim 14 wherein the interior surfaces of a tubular deformed metal product are to be protected from oxidation, said powder mixture being blown into the tubular product to coat the interior surfaces.

17. The method of claim 14 wherein in a piercing mill utilizing a tubular metal workpiece, said powder mixture is introduced into the interior of the same prior to engagement with a mandrel.

18. The method of claim 14 wherein in a punching press said powder mixture is introduced between said workpiece and the container and between said workpiece and the mandrel.

19. The method of claim 21 wherein said powder mixture includes constituents having an amorphous structure, the quantitative ratio of space-lattice crystalline constituents to amorphous constituents being such as to devitrify the amorphous constituents forcing spontaneous crystallization of the same on the deformed metal product during cooling.

20. The process of claim 19 wherein the workpiece is being physically deformed by pressing the same through an extrusion die, and said powder mixture is introduced between the workpiece and the extrusion die.

21. The method of claim 19 wherein the interior surfaces of a tubular deformed metal product are to be protected from oxidation, said powder mixture being blown into the tubular product to coat the interior surfaces.

22. The method of claim 19 wherein in a piercing mill utilizing a tubular metal workpiece, said powder mixture is introduced into the interior of the same prior to engagement with a mandrel.

23. The method of claim 19 wherein in a punching press said powder mixture is introduced between said workpiece and the container and between said workpiece and the mandrel.

References Cited by the Examiner

UNITED STATES PATENTS

| | | | |
|---|---|---|---|
| 2,530,837 | 11/1950 | Orozco et al. | 252—18 |
| 2,538,917 | 1/1951 | Serjournet et al. | 72—42 |
| 2,715,765 | 8/1955 | Brown et al. | 29—424 |
| 2,810,478 | 10/1957 | Serjournet et al. | 72—42 |
| 2,990,610 | 7/1961 | Luckerath et al. | 72—42 |
| 3,039,888 | 6/1962 | Serjournet et al. | 117—18 |
| 3,059,769 | 10/1962 | Frost | 72—42 |
| 3,061,093 | 10/1962 | Edgecome | 72—42 |
| 3,110,399 | 11/1963 | Gordon | 72—42 |

CHARLES W. LANHAM, *Primary Examiner.*

W. H. JUST, *Assistant Examiner.*